No. 620,483. Patented Feb. 28, 1899.
E. A. MORRIS.
STALK AND HAY RAKE.
(Application filed Apr. 29, 1898.)
(No Model.)
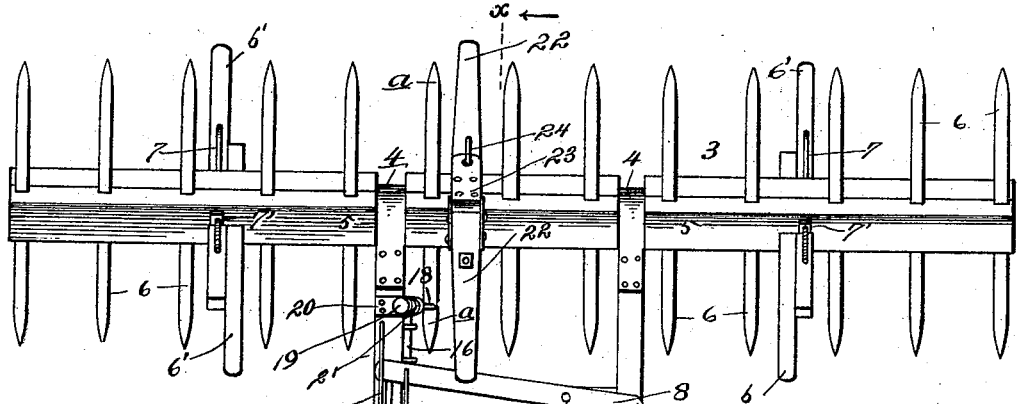
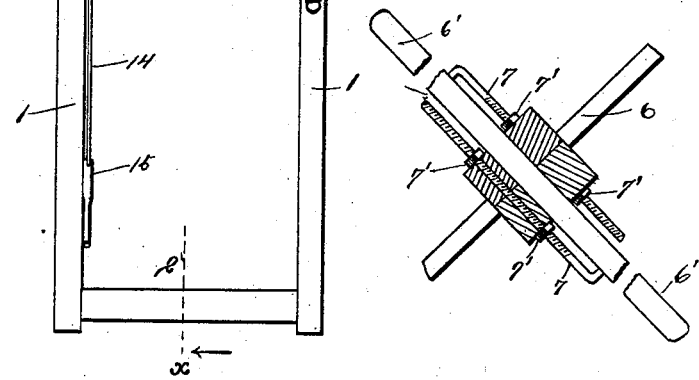
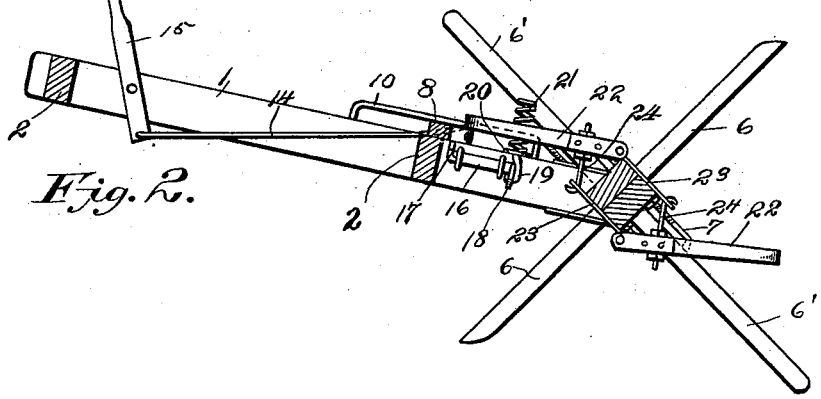
Witnesses
Inventor
Edwin A. Morris.
by V. S. Stockbridge,
his Attorney

UNITED STATES PATENT OFFICE.

EDWIN A. MORRIS, OF HAYES, ILLINOIS.

STALK AND HAY RAKE.

SPECIFICATION forming part of Letters Patent No. 620,483, dated February 28, 1899.

Application filed April 29, 1898. Serial No. 679,244. (No model.)

*To all whom it may concern:*

Be it known that I, EDWIN A. MORRIS, a citizen of the United States, residing at Hayes, in the county of Douglas and State of Illinois, have invented certain new and useful Improvements in Stalk and Hay Rakes; and I do hereby declare the following to be a full, clear, and exact description of the invention, such as will enable others skilled in the art to which it appertains to make and use the same.

The invention relates to an improvement in stalk and hay rakes of the type in which the rake head and teeth are made to revolve by contact with the ground and by the weight of the load carried upon the operative teeth; and it consists in a means for adjusting the angle of presentation of the teeth to the ground and in a means for automatically tripping the latch-lever for allowing the arms connected with the rake-head to engage said lever for holding the rake-teeth in operative position. It will be understood from the following description and claims, reference being had to the accompanying drawings, in which—

Figure 1 is a plan view of the improved rake in operative position. Fig. 2 represents a longitudinal section through the same on the line *x x* of Fig. 1. Fig. 3 is an enlarged detail section showing the adjustable arms or bars for regulating the angle of presentation of the rake-teeth to the ground and assisting in assuring the rotation thereof.

1 1 indicate parallel side bars of the longitudinal frame, the transverse bars connecting said side bars being indicated at 2 2'.

3 indicates the rake-head, which is connected with the rear ends of the side bars 1 by means of metallic straps 4, passing around the cylindrical portions of the rake-head, as indicated at 5, thereby journaling the rake-head in said straps to permit its rotation.

6 indicates the teeth, passing through the rake-head and extending upon opposite sides thereof to adapt them to operate upon the material to be collected thereby, the construction thus far described being similar to that of other well-known rakes of corresponding type.

The rake-head 3 is made, preferably, rectangular in form in cross-section, as indicated, and is perforated at right angles to the perforations for the teeth to receive adjustable bars or rods 6' 6', which extend through the rake-head and are made adjustable therein for increasing or diminishing the amount of their projection through said rake-head by means of angular bolts 7, one arm of which engages the rod or bar 6', the other arm of said bolts passing through the rake-head in a plane parallel with the rod or bar 6', to which it is connected and is adapted to receive nuts 7', located on opposite sides of the rake-head and by the adjustment of which the rods or bars can be drawn in or set farther out relative to the rake-head in a manner that will readily be understood. These rods in operative position are designed to rest at their outer ends upon the ground in rear of the rake-teeth and suspended at an opposite angle thereto, thereby adapting them to counteract largely the weight of the rake head and teeth by dragging upon the ground. By adjusting them in or out relative to the rake-head the angle of presentation of the teeth can be adjusted as the rods are made to rest upon the ground nearer to or farther away from the points of the teeth. This arrangement is regarded as important, as the rods or bars 6' in connection with the forward support for the frame-bars are made to largely carry the weight of the rake, thereby relieving the teeth of much of their frictional contact with the ground.

The forward end of the rectangular rake-frame is designed to be supported upon the rear end of a wagon and attached thereto to be drawn forward by the wagon and the team attached thereto; but it will be apparent that a pole or shafts may be attached to the forward end of the frame and a draft animal or animals connected directly therewith for propelling said frame and the rake. Upon the frame, adjacent to the overlying rear transverse frame-bar 2', is a latch-bar 8, pivoted near one end at 9 to one end of the side frame-bars and at its opposite end adapted to move in a suitable guide-loop 10, secured to the side bar at the swinging end of the latch-bar. Adjacent to said guide-loop 10 is an angle-plate 11, secured to the side bar and provided at its forward end with an upright perforated portion through which a pin 12, connected to the swinging end of the latch-bar, is adapted to slide as the latch-bar is vibrated or moved backward and forward, swinging upon its pivot. To the heel extension of the latch-bar, beyond its pivot, is a spiral spring 13, the forward end of the spring being secured to the adjacent side bar 1, the tension of the spring being exerted to force the operative end of the latch-bar into its extreme rearward position. To the latch-bar 8, near its swinging end, is connected one end of a rod or link 14, which at its opposite end is connected with the lower end of an upright lever 15, pivoted intermediate its ends to the inner side of the adjacent longitudinal frame-bar, the arrangement being such that an attendant by pressing rearward upon the upper end of the lever can draw the latch-bar forward, overcoming the tension of the spring 13. To the inner side of the longitudinal bar on which the swinging end of the latch-bar rests is secured a rock-shaft 16, mounted in suitable bearings in said frame and provided at its forward end with an arm 17, adapted to rock up into engagement with the latch-bar when the latter has been forced forward for locking said latch-bar in position to permit the rotation of the rake head and teeth. The rear end of the rock-shaft 16 is provided with an inwardly-extending arm 18, to which the lower end of a headed pin or rod 19 is connected, said pin or rod, near its lower end, passing through a perforated plate 20, between which and the head, on the upper end of the pin 19, is arranged a spiral spring 21, surrounding said pin or rod, and the tension of which is exerted to uphold the arm 18, with the forward arm 17 of the rock-shaft in engagement with the latch-lever for locking the latter in its forward or inoperative position.

22 22 indicate arms on the rake-head arranged at right angles, or substantially so, to the rake-teeth on opposite sides of the rake-head and adapted to engage the latch-lever 8 when the latter is in operative position for holding the rake head and teeth against rotation. The arms 22 are hinged to straps 23, which at their opposite ends extend beyond the rake-head and are provided with hooks or eyes engaging wire rods or links 24, which at their opposite ends connect with the opposite arms 22. By adjusting the length of these links the angle of the arms 22 can be adjusted as desired for causing them to engage the latch-bar sooner or later relative to the rotation of the rake-teeth, and thereby causing the latter to be held at any desired angle to the ground. Intermediate the arms 22 and the arm 18 of the rock-shaft are rake-teeth (indicated at $a$) which in the revolution of the rake-head come in contact with the outer end of said arm 18, which is inclined on its outer face, the teeth in their passage by said arm overcoming the tension of the spring and forcing the locking-arm 17 down out of engagement with the latch-lever, thereby permitting the latter to be forced rearward for engaging with the succeeding locking-arm 22.

By the construction described it will be seen that whenever the rake-teeth upon one side of the rake-head have secured the desired load of stalks or other material being operated upon the attendant, by pressing the upper end of the lever 15 rearward, draws the latch-lever 8 out of engagement with the arm 22, thereby allowing the rake head and teeth to revolve and discharge their load, the locking-arm on the rock-shaft immediately springing into engagement with said latch-lever for holding it in such position until the rake-head is rotated sufficiently far to bring the teeth $a$ into contact with the arm for tripping the latch-bar and allowing it to return to its operative position.

The operation of the several parts will be readily understood from the foregoing description. It will be apparent that the form and arrangement of the locking-lever and of its locking and tripping devices may be varied from the specific construction shown without departing from the spirit of the invention.

Having thus described the invention, what is claimed as new, and sought to be secured by Letters Patent, is—

1. The combination in a stalk and hay rake, with a revoluble rake-head provided with oppositely-disposed teeth, of arms arranged at right angles to said teeth and made adjustable endwise for the purpose and substantially as described.

2. The combination with a revoluble rake-head, of the oppositely-extending rake-teeth, adjustable arms arranged at right angles to said teeth, and upon opposite sides of the rake-head, and means for adjusting the said arms endwise for varying the extent of their projection from the rake-head, substantially as and for the purpose described.

3. In a stalk and hay rake, the combination with the frame thereof, of the pivoted latch-bar, oppositely-extending arms on the rake-head for engaging said bar, means for withdrawing the latch-bar from engagement with said arms, and means for automatically locking said latch-bar in inoperative position, substantially as described.

4. The combination in a stalk and hay rake, of the revoluble rake-head, arms thereon for engaging the pivoted latch-bar, means for withdrawing said latch-bar from engagement with said arms, means for locking said latch-bar in inoperative position, and means for automatically tripping the locking device engaging said latch-bar for allowing the latter to return to its normal position for engaging the arms on the rake-head, substantially as described.

5. The combination in a stalk and hay rake, provided with a revoluble rake-head having oppositely-extending rake-teeth, of oppositely-extending arms on said head, the pivoted latch-bar on the frame for engaging said arms and holding the rake-teeth in operative position, the spring for holding said latch-bar normally in position to engage the arms on the rake-head, a rock-shaft journaled on the rake-frame and provided with an arm for engaging the latch-lever for holding the same in inoperative position, an arm on said rock-shaft arranged in the path of the arm or tooth on the rake-head to be automatically operated thereby for tripping the latch-lever-locking arm, and a spring connected with said arm on the rock-shaft arranged to hold the locking-arm on said shaft normally in engagement with the latch-lever, substantially as described.

6. The combination in a stalk and hay rake, of a pivoted latch-bar, hinged arms on the rake-head for engaging said latch-bar, and means for adjusting the angle of said hinged arms, in combination with means for operating said latch-bar to release said hinged arms, and means for automatically engaging said latch-bar for holding it in inoperative position, substantially as described.

In testimony whereof I affix my signature in presence of two witnesses.

EDWIN A. MORRIS.

Witnesses:
J. E. DAVIS,
A. W. STARKEY.